ROBERT J. SCHWINGHAMER,
JOHN R. RASQUIN,
INVENTORS

ROBERT J. SCHWINGHAMER,
JOHN R. RASQUIN,
INVENTORS

United States Patent Office 3,229,099
Patented Jan. 11, 1966

3,229,099
ELECTRO-OPTICAL ALIGNMENT CONTROL SYSTEM
Robert J. Schwinghamer and John R. Rasquin, Huntsville, Ala., assignors to the United States of America as represented by the Administrator of the National Aeronautics and Space Administration
Filed Nov. 29, 1962, Ser. No. 241,085
8 Claims. (Cl. 250—201)
(Granted under Title 35, U.S. Code (1952), sec. 266)

The invention described herein may be manufactured and used by or for the Government of the United States of America for governmental purposes without the payment of any royalties thereon or therefor.

This invention relates to the art of automatically aligning two objects which are not mechanically interconnected and particularly to an alignment system for maintaining two-axis alignment between objects, e.g., a tool and tool guide, wherein one of them maintains a reference position in a plane lying in one of two axes which is perpendicular to the other axis.

The development and construction of missiles and space vehicles have presented many new requirements for tooling and tooling systems. One of them arises from an anticipated basic change in manufacturing and assembly approaches to the construction of large space vehicles. It appears probable that it will be necessary to construct the body or tank sections of the larger vehicles in a vertical manner rather than in a horizontal one, one reason for this change being the difficulty in retaining body cross-sectional integrity when large thin-walled cylinders are positioned horizontally. It was from the problem presented in effectively and efficiently adapting to this new type assembly that this invention arose.

The outer skin of a large space vehicle is normally made of sections of aluminum cylinders which are on the order of 5 to 10 feet long. The ends of a number of such cylinders are welded together to principally form the body of the space vehicle. However, before this operation can be achieved on very large diameter space vehicles, it appears necessary to precisely mill the ends of each section to provide end surfaces which are "squared," i.e., surfaces which lie in a plane perpendicular to the longitudinal axis of a section. This must be done to insure that the sections when welded together comprise a right circular cylinder or one having a single central axis.

This invention is particularly directed to means of relatively moving a milling, or other tools, along the circumference of a large diameter tank-section in order to accommodate the tremendous relative travel involved, often in excess of 150 feet, during milling operations on extremely large vehicles. There are, of course, two basic approaches to the problem of tool-tank-section relative movement; movement of the tank section with respect to a fixed milling tool or movement of the tool while holding the tank section fast. The conventional approach would be the latter, and perhaps jigs can be constructed to hold the extremely large tank sections in the precise alignment necessary to perform the job. However, it is quite obvious that, in the case of extremely large vehicles, the jigs tend to be extremely cumbersome, weighing perhaps several tons to provide sufficient stability, and they would be very costly.

In accordance with the invention a control system is provided for maintaining alignment between a first and second movable body wherein the first body is allowed movement within a single plane and the second body is allowed movement in a line perpendicular to this plane. One of the movable bodies includes a small area source of radiant energy and the other body includes means for directionally sensing this energy. Circuit means are provided which respond to directional misalignment between the energy source and sensor and provide a first electrical output representative of misalignment in the referenced plane and a second electrical output representative of misalignment along the referenced perpendicular line. Drive means are employed which are responsive to the first electrical output to move the first movable body within the referenced plane in a direction to produce alignment with the second movable body, and are responsive to the second electrical output to move the second movable body along the referenced line perpendicular in a direction to produce alignment with the first movable body.

It is an object of this invention to overcome the objections, difficulties and inefficiencies of conventional approaches to the problem presented by providing a new concept in automatic tooling which encompasses control techniques employable in the afore stated as well as other control applications.

Other objects and many attendant advantages of the present invention will be apparent from the following detailed description when taken together with the accompanying drawings in which.

Figure 1:
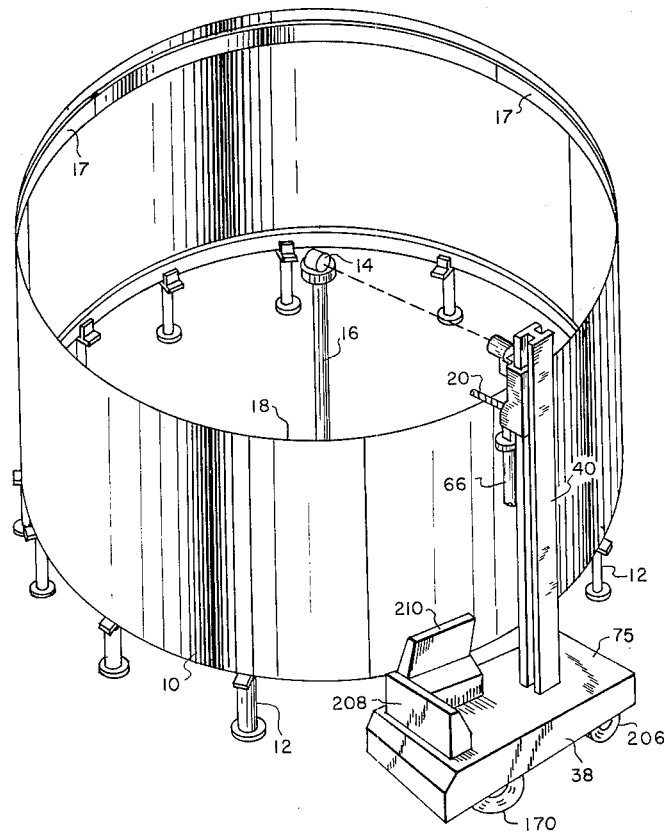
FIGURE 1 is a pictoral view showing certain basic features of an embodiment of the invention.
Figure 2:
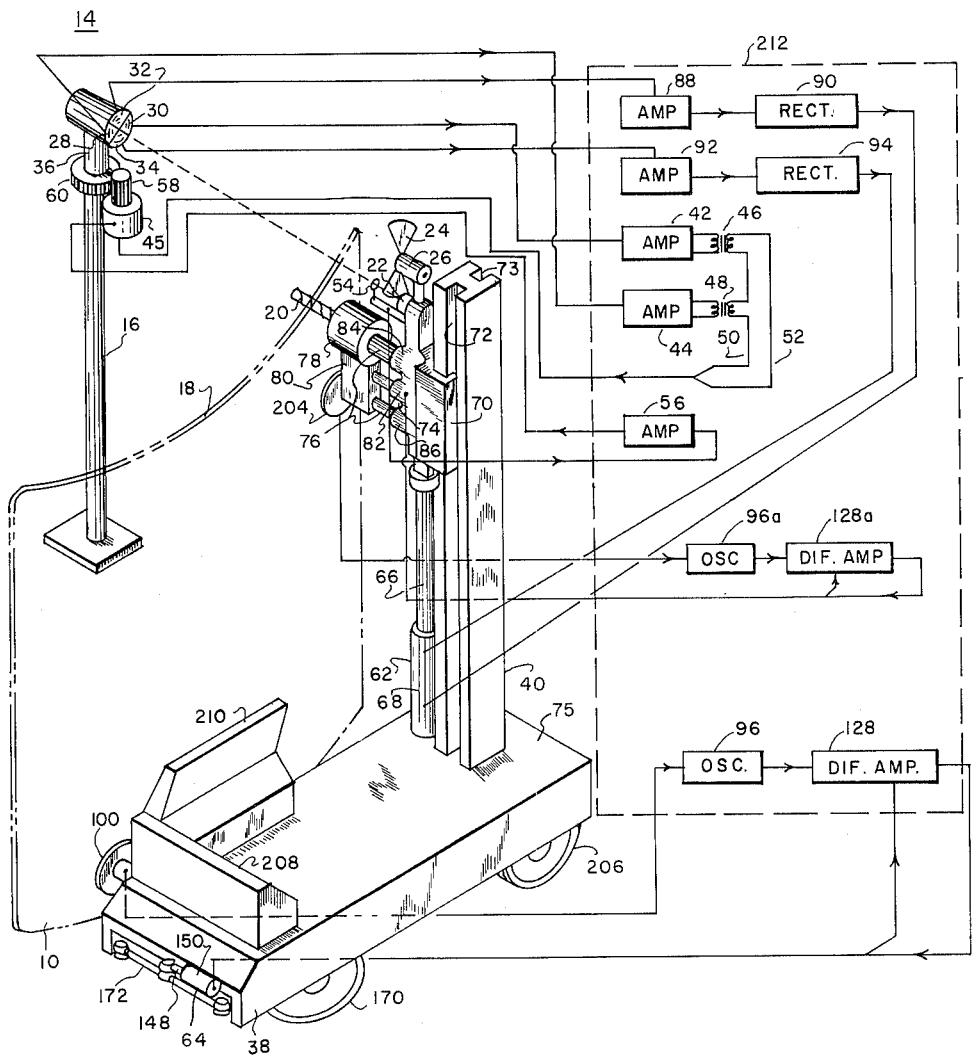
FIGURE 2 is a diagrammatic view illustrating in substantial detail an embodiment of the invention.

With reference to FIGURES 1 and 2, a circular member or tank section 10 is mounted upon jack supports 12, which are positioned upon a supporting surface or floor, in such a manner that the longitudinal axis of tank section 10 is reasonably plumb. As a practical example, the direction for this axis would be chosen, such as a vertical direction illustrated and discussed hereinafter, and the jack supports 12 adjusted until the sides of tank section 10 are parallel to the chosen axis. Various known methods may be employed to perform this function, which is not an element of the invention.

In one method of prealignment, an optical square (not shown) would be mounted on optical tracker or tracking receiver 14 with the plane of one of its mirrors parallel to the plane of rotation of tracking receiver 14 which is horizontal here as it rotates upon the vertical supporting means or column 16. An autocollimator is then positioned above the optical square and in a line to direct a beam of parallel rays in the true vertical (or other chosen direction) toward the horizontal mirror of the optical square. Then the optical square would be precisely adjusted by positioning support member 16 until the horizontal mirror is truly perpendicular to the rays of light from the autocollimator when the mirror is rotated via rotation of tracking receiver 14. Next, the autocollimator would be positioned adjacent to the side walls of tank section 10 and attached to a horizontally positioned member of a conventional type square. The vertical member of the square is placed against the tank section and jack supports 12 adjusted until the autocollimator is precisely aligned with the vertical mirror of the optical square at several positions on the circumference of tank section 10. Tank section 10 is held to a cylindrical configuration by spreader members 17.

As illustrated in the drawings, the invention is being employed here to mill to a level or plumb condition the top surface 18 of tank section 10. This is accomplished by precisely moving milling cutter 20 in a predetermined plane around tank section 10. A small light source 22 (FIG. 2) is positioned to project generally a beam toward the movable tracking receiver or optical tracker 14, which beam is chopped or interrupted by rotating shutter 24 driven by shutter motor 26. The chopped light falls upon directionally focused photocells 28, 30, 32 and 34 of optical tracker 14. The photocells are positioned and focused to sense parallel light perpendicular to the axis of rotation of rotatable mount 36 mounted on vertical support 16 which support is fixed mounted at its lower end in a manner not illustrated.

Photocells 28 and 30 are arranged to be differentially sensitive and responsive to light received in a horizontal plane and photocells 32 and 34 to be differentially sensitive and responsive to light received in a perpendicular plane. Thus, for example, if light source 22 is moved to the right side (into the paper) of the direction of focusing of tracker 14, then photocell 30 will sense increasingly more light, while photocell 28 senses progressively less light. Similarly, if light source 22 is raised above the direction of focusing of optical tracker 14, photocell 32 will sense more light than photocell 34.

Chopping of the light from source 22 is accomplished by motor 26 and shutter 24 at a frequency other than that to be anticipated by ambient light which typically would include light of constant amplitude and light varying at a 60 or 120 cycle rate. A 200–300 cycle rate of chopping has worked well.

In operation, mobile supporting means or vehicle 38 which supports vertical supporting means or column 40, holding milling cutter 20, is driven about tank section 10, automatically or manually controlled by conventional means, at a rate appropriate to the milling operation involved. Optical tracker 14 thus must track this movement, and to accomplish this, differential output of photocells 28 and 30 energize a servo system consisting of horizontal amplifiers 42 and 44, and servomotor 45 to rotate optical tracker 14. Amplifier 42 is driven by photocell 30 and amplifier 44 is driven by photocell 28. Amplifiers 42 and 44 are selectively responsive to the frequency of chopping (and thus are unresponsive to stray light) and their outputs are combined by transformers 46 and 48 in phase opposition to produce a servomotor drive voltage on leads 50 and 52. This drive voltage follows the amplitude of the signal resulting from the predominate photocell output and thus indicates both the sense (direction) and magnitude of the error in alignment of optical tracker 14 with respect to light source 22. No error, or correct alignment, is manifested by equal amplitude outputs of photocells 28 and 30, resulting in a zero drive voltage.

Leads 50 and 52 couple the servo drive voltage to one input of two-phase servomotor 45, and a synchronized voltage is applied as the other, conventional, input of servomotor 45. This synchronized voltage is obtained as an output from reference photocell 54 which receives a sampling of chopped light, the output of photocell 54 being first amplified in reference voltage amplifier 56 and then applied to servomotor 45. The interconnections and phasing of leads 50 and 52 and the output of amplifier 56 are such as will cause servomotor 45 to rotate rotatable mount 36, and thus optical tracker 14, in a direction which will produce zero drive voltage to servomotor 52 when there is optical alignment with light source 22. By these means, as vehicle 38 is moved about tank section 10, optical tracker 14 will be caused to be rotated as necessary to maintain the described alignment. Drive between servomotor 45 and rotatable mount 36 is accomplished by gear coupling between drive gear 58 and driven gear 60.

Figure 3:
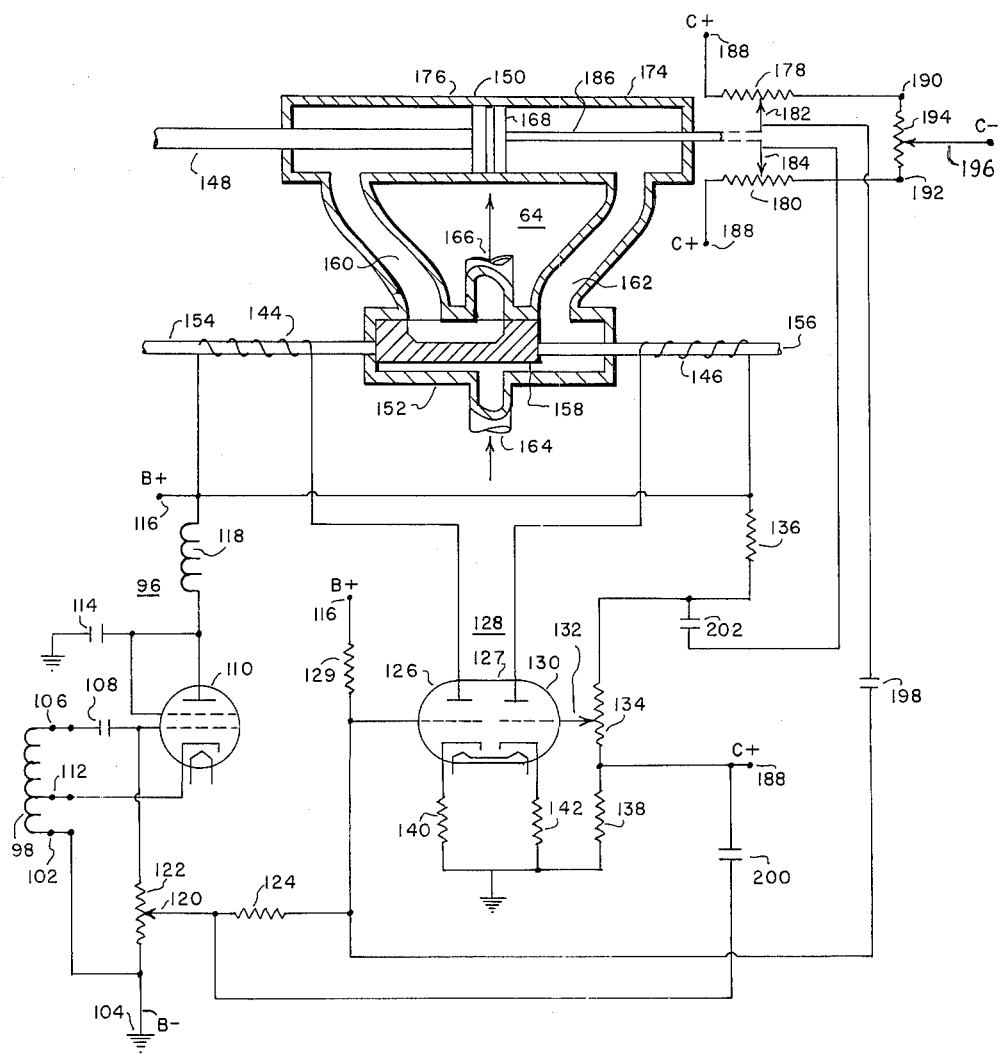
FIGURE 3 is a schematic diagram of a proximity control device illustrated in block diagram form in FIGURE 2.

Vertical movement of milling cutter 20 is effected by vertical jack assembly 62, which has the same functional elements as illustrated for vehicle steering jack assembly 65 in FIGURE 3. Piston drive rod 66, moving in and out of the cylinder 68 of jack assembly 62 provides vertical movement to milling cutter 20 through C shaped support collar 70, which traverses grooves 72 and 73 in vertical support column 40. Support column 40 is mounted adjacent to cylinder 68 on bed 75 of vehicle 38. Support collar 70 directly supports horizontal movement hydraulic jack assembly 74 (functionally identical to jack assembly 64 in FIG. 3), horizontal guides 76, light source 22, reference photocell 54, chopper motor 26 and shutter 24. Motor 78, which supports and turns milling cutter 20, is in turn supported by horizontal piston drive rod assembly 80 and horizontal guides 76. Piston drive rod 80 is moved in and out of cylinder 82 in a manner to be described, and support for this motion is provided by horizontal guides 76 which slide in and out of horizontal cylindrical guides 84 and 86.

Misalignment of milling cutter 20 in elevation from a predetermined plane is sensed by the difference in electrical outputs of photocells 32 and 34. The output of photocell 32 is amplified in vertical amplifier 88 and as amplified is applied to rectifier 90 to obtain as an output of rectifier 90 a first direct current (D.C.) output. Similarly, the output of photocell 34 is amplified in vertical amplifier 92 and thereafter rectified in rectifier 94 to provide a second D.C. output. These two D.C. outputs are then applied to vertical jack assembly 62 which responds to move piston rod 66 up or down depending upon which of the outputs of rectifiers 90 and 94 is the greater. The interconnections between rectifiers 90 and 94 and the electrical input to vertical jack assembly 62 are such as to produce vertical movement of piston rod 66, and thus light source 22, in a direction to bring the combined outputs of rectifiers 90 and 94 to a null value; at which point the motion of piston rod 66 stops. This point is adjusted by means of the elevation of optical tracker 14 to be that which produces the desired position of milling cutter 20 which is varied in vertical position as is light source 22 through support collar 70 by piston drive rod 66. Milling cutter 20 will be thus held to a precise elevation as vehicle 38 is moved about tank section 10 and in this manner a precise plane cut can be made on tank section 10.

The system thus far described provides means for optically tracking the motion of vehicle 38 around tank section 10 and for holding milling cutter 20 to a plane of desired elevation. In order to hold milling cutter 20 in a correct cutting position to mill the top surface 18 of tank section 10, insofar as a radial position with respect to the geometric center of tank section 10 is concerned, two proximity sensing and control systems are included. Referring now additionally to FIGURE 3, the first of these systems is employed to guide vehicle 38 around tank section 10 and with a precise distance separating vehicle 38 and tank section 10. To accomplish this a signal representative of this distance is obtained by means of oscillator 96 arranged as a proximity indicator. Oscillator 96 is a form of Hartley oscillator in which the oscillating tank coil 98 is enclosed in a mounting enclosure 100 (FIG. 2) and fixed to the side of vehicle 38 as a proximity sensor. One end terminal 102 of coil 98 is connected to ground terminal 104 and the other end terminal 106 of coil 98 is connected through resonating capacitor 108 to the grid of vacuum tube 110 (e.g., a triode connected 6V6). An intermediate terminal 112 of coil 98 is connected to the cathode of vacuum tube 110. The anode of vacuum tube 110 is held at A.C. (alternating current) ground potential by by-pass capacitor 114, and tube 110 is energized by a direct current voltage applied between B+ terminal 116 and B− or ground. The output of oscillator 96 is obtained from variable terminal 120 of potentiometer 122 connected between the grid of tube 110 and ground.

The operation of oscillator 96 as a proximity circuit is generally conventional in that metal (e.g., tank section 10) coming in proximity to coil 98 varies the coupling of the output to input feedback circuit of the oscillator to vary the intensity of oscillation. The output circuit includes the portion of coil 98 between terminal 102 and 112 and the input circuit includes the portion between terminal 112 and terminal 106. Changes in intensity of oscillation of oscillator 96 will vary the grid current drawn by the circuit through potentiometer 122 and thus provide an output at variable terminal 120 of potentiometer 122 which is a function of the proximity, or distance, of tank section 10 from coil 98. Since milling cutter 20 is positioned radially by vehicle 38 upon which coil 98 is mounted, the output of oscillator 96 is thus a function of the radial position of milling cutter 20 with respect to the center of tank section 10.

Variable terminal 120 of potentiometer 122 is connected through resistor 124 to the grid of a first triode of triode section 126 of dual triode vacuum tube 127 (e.g., a 12AU7) of differential amplifier 128. A small positive bias is applied to the grid through resistor 129 from B+ source terminal 116. The grid of a second triode or triode section 130 of dual triode 127 is fed a reference voltage from variable terminal 132 of potentiometer 134, connected in series with resistor 136 and resistor 138, between a B+ source terminal 116 and ground. The cathodes of dual triode 127 are connected to ground through cathode resistors 140 and 142, respectively.

In the manner described, the first triode section of differential amplifier 128 is fed a variable input voltage which is a function of the distance between vehicle 38 and tank section 10 and the second triode section 130 is fed a fixed input reference voltage. The result is that the anode current through jack coil 144 in circuit with triode 126 will vary with respect to a fixed current through jack coil 146 in circuit with the anode of triode 130. Energizing current for triodes 126 and 130 is obtained by connecting B+ terminal 116 through coils 144 and 146 to the anodes of triodes 126 and 130. Jack coils 144 and 146 are in practice operative elements of electrohydraulic jack assembly 64 and serve to control the movement of piston rod 148 in and out of hydraulic servo actuator cylinder 150 of jack assembly 64. As indicated above, jack assembly 64 is functionally identical to jack assemblies 62 and 74 and is a standard electrohydraulic unit such as comprise electrohydraulic differential valve 152 (e.g., Moog valve, Mod. 21–112A) and hydraulic servo actuator 150 (e.g., Moog servo actuator, Mod. 171038), illustrated schematically in FIGURE 3.

With the proximity of enclosure 100 and coil 98 with respect to tank section 10 set to a desired distance, potentiometer 134 is adjusted to set the grid voltage on triode 130 to a point where the currents through coils 144 and 146 are equal and equal forces are then exerted on valve control armatures 154 and 156 causing valve piston member 158 to assume a balanced position with ports 160 and 162 closed with respect to hydraulic fluid intake 164 and fluid exhaust 166. The source of hydraulic fluid for supplying intake 164 and a fluid return for exhaust 166 are conventional and are not shown. In the valve position just described, drive piston 168 remains stationary and thus the steering of front wheels 170 of vehicle 38 (FIG. 2), through piston rod 148 and tie rods 172 (FIG. 2), is unchanged. The linkage between piston rod 148 and wheels 170 through tie rods 172 is conventional and is not shown in detail.

If, for example, the movement of vehicle 38 around tank section 10 results in a departure from the initially set optimum or desired spacing between tank section 10 and vehicle 38, the output of oscillator 96 will change producing an unbalance in differential amplifier 128 and a difference in currents through coils 144 and 146. Assume that such a departure produces a distance between vehicle 38 and tank section 10 which is too great. Then, if tank section 10 is of aluminum, and thus has a permeability of approximately unity, as coil 98 is moved farther from tank section 10, there will be less coupling between the output and input of oscillator 96 and the output voltage of oscillator 96 will be less negative than for a balanced condition. Accordingly, the voltage on the grid of triode 126 becomes less negative and a greater current is drawn through coil 144 than through coil 146. This causes valve piston member 158 to move to the left (the position shown, if the difference in currents is sufficient) allowing fluid under pressure to enter right cylinder portion 174 and fluid to exhaust from left cylinder portion 176. This causes piston 168 and piston rod 148 to move outward, to the left, and cause front wheels 170 to be turned toward tank section 10 and vehicle 38 to assume a closer position to tank section 10 as it progresses around the tank section.

The opposite effect will occur if vehicle 38 should get too close to tank section 10, causing the current through coil 144 to fall below the flow of current through coil 146. Of course, when the vehicle moves to a position of correct spacing again, the currents through coils 144 and 146 become equal and valve piston member 158 closes the intake and exhaust lines 164 and 166, and piston 168 remains stationary, holding proper proximity of vehicle 38 to tank 10.

Potentiometers 178 and 180 are employed in a negative feedback circuit and in the Moog actuator referred to above are a part of jack assembly 64. Movable terminals 182 and 184 of potentiometers 178 and 180, respectively, are moved as illustrated by auxiliary piston rod 186 as piston 168 is moved. One end terminal of each of potentiometers 178 and 180 are connected to a C+ terminal 188 of a bias source (not shown) and the other end terminals, terminals 190 and 192 are connected across potentiometers 194 to the C− terminal of said bias source through variable terminal 196. Potentiometer 178 provides a negative feedback signal through capacitors 198 and 200 across resistor 124 to triode 126 in response to movement of piston 168 and potentiometer 180 provides a similar effect through capacitor 202 across potentiometer 134 to triode 130. This feedback produces a damping effect that stabilizes the motion of piston 168 and reduces the tendency to overshoot. The feedback voltages, across resistor 124 and potentiometer 134, result from changes in charge on capacitors 198, 200, and 202. These occur as piston 168 repositions movable terminals 182 and 184 and charge-discharge currents flow through resistor 124 and potentiometer 134.

The second proximity detection and control system employed herein is electrically identical to the proximity control system just described and it is used for the purpose of correcting for irregular floor surfaces on which vehicle 38 moves. Oscillator 96a corresponds to oscillator 96 and differential amplifier 128a corresponds to differential amplifier 128. For example, the vehicle itself may be a correct distance from tank section 10 but if, for example, one of the wheels of vehicle 38 would encounter a significant slant in the floor, the tendency would be to move milling cutter 20 toward or away from tank section 10. To counteract this, an oscillator sensing coil similar to the coil 98 shown in FIGURE 3 is mounted in a fixed coil mount 204 on horizontal piston drive rod assembly 80 that supports motor 78 which turns milling cutter 20. With cant movement of the position of milling cutter 20 due to the mentioned irregularity in the floor, coil mount 204 would move toward or away from tank section 10 giving rise to a change in output voltage of oscillator 96a which in turn would cause differential amplifier 128a to cause horizontal movement hydraulic jack assembly 74 to reposition drive rod assembly 80, and thus milling cutter 20, to a predetermined position.

Power for vehicle 38 and the actual drive to rear wheels 206, or front wheels 170, is conventional and is not shown. Electrical cables supplying signal energy between optical tracker 14 and vehicle 38 are provided by means of an overhead trolley or underground trolley, not shown. Console cabinets 208 and 210 are illustrative of the positioning of circuitry 212 shown in block form in FIGURE 2.

Optical tracker 14 while illustrated as including four photocell assemblies for differential sensing of light in vertical and horizontal planes, may comprise a more elaborate photo scanning device such as the FW118 image tube equipped star tracker, marketed by ITT Federal Laboratories in which case the star tracker would be modified to disable its vertical tracking servo system, and the vertical error signals then employed for vertical tracking by application to jack assembly 62.

Obviously, many modifications and variations of the present invention are possible in the light of the above teachings. It is, therefore, to be understood that within the scope of the appended claims the invention may be practiced other than as specifically described.

What is claimed is:

1. A control system for maintaining alignment between first and second movable bodies comprising:
 (A) first supporting means for supporting said first movable body to allow movement of said first movable body within a horizontal plane;
 (B) second supporting means for movably supporting said second movable body with respect to said second supporting means in a line perpendicular to said horizontal plane and for moving said second movable body in a path spaced from said first supporting means;
 (C) one of said bodies comprising a small area source of radiant energy;
 (D) the other of said bodies comprising directional energy sensing means;
 (E) circuit means responsive to said sensing means for providing a first electrical output representative of misalignment between said directional energy sensing means and said source of radiant energy in said horizontal plane and for providing a second electrical output representative of misalignment between said directional energy sensing means and said source of radiant energy along said line perpendicular to said horizontal plane;
 (F) first drive means responsive to said first electrical output for moving said first movable body within said horizontal plane in a direction to produce alignment with said second movable body;
 (G) said first supporting means and first drive means including means for rotating said first movable body;
 (H) second drive means responsive to said second electrical output for moving said second movable body with respect to said second supporting means along said line perpendicular to said horizontal plane in a direction to produce alignment with said first body;
 (I) a member spaced from said first supporting means;
 (J) said second supporting means further comprising means for maintaining a fixed space between said second supporting means and said member.

2. A control system for maintaining alignment between first and second movable bodies comprising:
 (A) first supporting means for supporting said first movable body to allow movement of said first movable body within a horizontal plane;
 (B) second supporting means for movably supporting said second movable body with respect to said second supporting means in a line perpendicular to said horizontal plane and for moving said second movable body in a path spaced from said first supporting means;
 (C) one of said bodies comprising a small area source of radiant energy;
 (D) the other of said bodies comprising directional energy sensing means;
 (E) circuit means responsive to said sensing means for providing a first electrical output representative of misalignment between said directional energy sensing means and said source of radiant energy in said horizontal plane and for providing a second electrical output representative of misalignment between said directional energy sensing means and said source of radiant energy along said line perpendicular to said horizontal plane;
 (F) first drive means responsive to said first electrical output for moving said first movable body within said horizontal plane in a direction to produce alignment with said second movable body;
 (G) said first supporting means and first drive means including means for rotating said first movable body;
 (H) second drive means responsive to said second electrical output for moving said second movable body with respect to said second supporting means along said line perpendicular to said horizontal plane in a direction to produce alignment with said first body;
 (I) a circular member with its center at substantially the position of said first supporting means;
 (J) said second supporting means further comprising means for maintaining a fixed space between said second supporting means and said member.

3. A control system for maintaining alignment between first and second movable bodies comprising:
 (A) first supporting means for supporting said first movable body to allow movement of said first movable body within a horizontal plane;
 (B) second supporting means for movably supporting said second movable body with respect to said second supporting means in a line perpendicular to said horizontal plane and for moving said second movable body in a path spaced from said first supporting means;
 (C) one of said bodies comprising a small area source of radiant energy;
 (D) the other of said bodies comprising directional energy sensing means;
 (E) circuit means responsive to said sensing means for providing a first electrical output representative of misalignment between said directional energy sensing means and said source of radiant energy to said horizontal plane and for providing a second electrical output representative of misalignment between said directional energy sensing means and said source of radiant energy along said line perpendicular to said horizontal plane;
 (F) first drive means responsive to said first electrical output for moving said first movable body within said horizontal plane in a direction to produce alignment with said second movable body;
 (G) said first supporting means and said drive means including means for rotating said first movable body;
 (H) second drive means responsive to said second electrical output for moving said second movable body with respect to said second supporting means along said line perpendicular in said horizontal plane in a direction to produce alignment with said first body;
 (I) a cylindrical member positioned with its cylindrical axis perpendicular to said horizontal plane and passing substantially through the location of said first supporting means;
 (J) said second supporting means further comprising means for maintaining a fixed space between said second supporting means and said cylindrical member;
 (K) said second movable body including means for maintaining a fixed space between said second movable body and said cylindrical member.

4. A control system for maintaining alignment between first and second movable bodies comprising:
 (A) first supporting means for supporting said first movable body to allow movement of said first movable body within a horizontal plane;
 (B) second supporting means for movably supporting said second movable body with respect to said second supporting means in a line perpendicular to said horizontal plane and for moving said second movable body in a path spaced from said first supporting means;

9

(C) one of said bodies comprising a small area source of radiant energy;
(D) the other of said bodies comprising directional energy sensing means;
(E) circuit means responsive to said sensing means for providing a first electrical output representative of misalignment between said directional energy sensing means and said source of radiant energy in said horizontal plane and for providing a second electrical output representative of misalignment between said directional energy sensing means and said source of radiant energy along said line perpendicular to said horizontal plane;
(F) first drive means responsive to said first electrical output for moving said first movable body within said horizontal plane in a direction to produce alignment with said second movable body;
(G) said first supporting means and first drive means including means for rotating said first movable body;
(H) second drive means responsive to said second electrical output for moving said second movable body with respect to said second supporting means along said line perpendicular to said horizontal plane in a direction to produce alignment with said first body;
(I) a cylindrical member positioned with its cylindrical axis perpendicular to said horizontal plane and passing substantially through the location of said first supporting means;
(J) said second supporting means further comprising means for maintaining a fixed space between said second supporting means and said cylindrical member;
(K) said second movable body including means for maintaining a fixed space between said second movable body and said cylindrical member;
(L) said second movable body further including means for contacting and performing work on said cylindrical member.

5. The control system set forth in claim 9 wherein said means for contacting said cylindrical member comprises a milling tool for horizontally milling an end of said cylindrical member.

6. A milling machine comprising:
(A) work tool means;
(B) movable support means attached to and adapted for moving said work tool means in a first plane along a work piece;
(C) first drive means coupled to said work tool means for selectively positioning said tool means along a line substantially perpendicular to said first plane, said first drive means being adapted to be energized by an electrical signal;
(D) a source of radiant energy mounted for simultaneous movement with said work tool means.
(E) directional radiant energy sensing means spaced from and adapted for detecting the radiant energy emitted from said source of radiant energy;
(F) second drive means coupled to said sensing means for moving said sensing means in said first plane when energized by an electrical signal;
(G) circuit means coupled to said sensing means for providing a first electrical signal responsive to any misalignment occurring between said source of radiant energy and said sensing means in said first plane and for providing a second electrical output signal responsive to any misalignment occurring between said source of radiant energy and said sensing means along said line substantially perpendicular to said first plane; and
(H) means coupling said first and second electrical signals to said second and first drive means, resepctively.

7. A milling machine comprising:
(A) a self propelled vehicle adapted to freely move over a supporting surface;

10

(B) means associated with said vehicle for maintaining said vehicle at a predetermined distance from a workpiece as said vehicle moves over said supporting surface;
(C) column means mounted on said vehicle means;
(D) movable support means mounted on said column means and adapted for movement above a line substantially perpendicular to said supporting surface;
(E) first drive means coupled to said movable support means for selectively positioning said movable support means along said line substantially perpendicular to said supporting surface when said first drive means is actuated;
(F) work tool means carried by said support means and adapted to perfom work upon said workpiece;
(G) a source of radiant energy mounted for simultaneous movement with said work tool means;
(H) directional radiant energy sensing means spaced from and adapted for detecting the radiant energy emitted from said source of radiant energy;
(I) second drive means coupled to and adapted for moving said sensing means in the same direction in which said vehicle is moving when said drive means is actuated;
(J) means coupled to said directional radiant energy sensing means for producing a first actuating signal when any misalignment occurs between said source and said sensing means along said line substantially perpendicular to said supporting surface and for providing a second actuating signal when any misalignment occurs between said source of radiant energy and said sensing means as said vehicle moves over said supporting surface; and
(K) means coupling said first and second actuating signals to said first and second drive means, respectively.

8. A milling machine comprising:
(A) a self propelled vehicle adapted to freely move over a supporting surface,
said vehicle including guide means for steerably directing the movement of said vehicle over said supporting surface;
(B) proximity sensor means mounted on said vehicle and operably connected to said guide means for maintaining said vehicle at a predetermined distance from a workpiece as said vehicle moves over said supporting surface;
(C) first column means mounted on said vehicle means;
(D) movable support means mounted on said first column means and adapted for movement along a line substantially perpendicular to said supporting surface;
(E) first drive means mechanically coupled to said movable support means for selectively positioning said movable support means along said line substantially prepindicular to said supporting surface when said first drive means is energized by an electrical signal;
(F) milling means carried by said support means for performing work upon said workpiece;
(G) a source of light mounted on said movable support means for simultaneous movement with said milling means;
(H) directional light responsive sensing means spaced from and adapted for detecting the light emitted from said source of light;
(I) second drive means mechanically coupled to and adapted for moving said sensing means in the same direction in which said vehicle is moving when said second drive means is energized by an electrical signal;
(J) electrical means coupled to said light responsive sensing means for producing a first electrical signal when any misalignment occurs between said source of light and said sensing means along said line substantially perpendicular to said supporting surface and for providing a second electrical signal when any misalignment occurs between said source of light and said sensing means as said vehicle moves over said supporting means; and (K) electrical conductor means connected between said electrical means and said first and second drive means for coupling said first and second electrical signals to said first and second drive means, respectively.

References Cited by the Examiner

UNITED STATES PATENTS

| | | | |
|---|---|---|---|
| 2,116,593 | 5/1938 | Bouvier et al. | 250—203 X |
| 2,924,768 | 2/1960 | Farrand et al. | 250—203 X |
| 2,982,859 | 5/1961 | Steinbrecher | 250—203 X |

RALPH G. NILSON, *Primary Examiner.*

WALTER STOLWEIN, *Examiner.*

J. D. WALL, *Assistant Examiner.*